United States Patent
Dickens

[15] 3,706,223
[45] Dec. 19, 1972

[54] SPEED INDICATOR FOR BOATS

[72] Inventor: Harry R. Dickens, 6915 N. Crestline, Spokane, Wash. 99207

[22] Filed: April 5, 1971

[21] Appl. No.: 131,227

[52] U.S. Cl. .................................................73/184
[51] Int. Cl. ...........................................G01c 21/10
[58] Field of Search.........73/184, 186, 187, 189, 228

[56] References Cited

UNITED STATES PATENTS

| | | | |
|---|---|---|---|
| 2,773,383 | 12/1956 | Kersten | 73/187 |
| 764,759 | 7/1904 | Owen | 73/189 |

FOREIGN PATENTS OR APPLICATIONS

| | | | |
|---|---|---|---|
| 1,993 | 2/1898 | Great Britain | 73/184 |

Primary Examiner—Donald O. Woodiel

[57] ABSTRACT

A device for indicating speed of a boat in the water. This device includes a clamp for attachment to the hull of a boat and on the clamp is carried a rotatable disc needle or pointer which will indicate the speed of the boat by aligning with the calibrations on the disc portion of the device. The device utilizes the principle of drag upon an object within the water.

2 Claims, 2 Drawing Figures

PATENTED DEC 19 1972 3,706,223

INVENTOR.
HARRY R. DICKENS

SPEED INDICATOR FOR BOATS

This invention relates to speedometers, and more particularly to a device for indicating the speed of a boat within the water.

It is therefore the primary purpose of this invention to provide a speed indicator for boats which will consist of a calibrated disc which has a rotatable pointer.

Another object of this invention is to provide a speed indicating device which may be clamped onto a portion of the boat desired and the pointer of the device is carried upon a knurled or otherwise roughened spool member around which is carried a line, one end of the line being attached to a weight which is dragged within the water and the other end of the line being secured by spring means to one end of the clamp and disc arrangement of the device.

Another object of this invention is to provide a device of the type described which will utilize a suction cup eye guide which will enable the line not to become fouled with the motor of the boat.

A further object of this invention is to provide a speed indicating device wherein accuracy of the invention may be obtained by spring tension through the pull of the drag force.

Other object of the present invention are to provide a speed indicator for boats which is simple in design, inexpensive to manufacture, rugged in construction, easy to use and efficient in operation.

Figure 1:
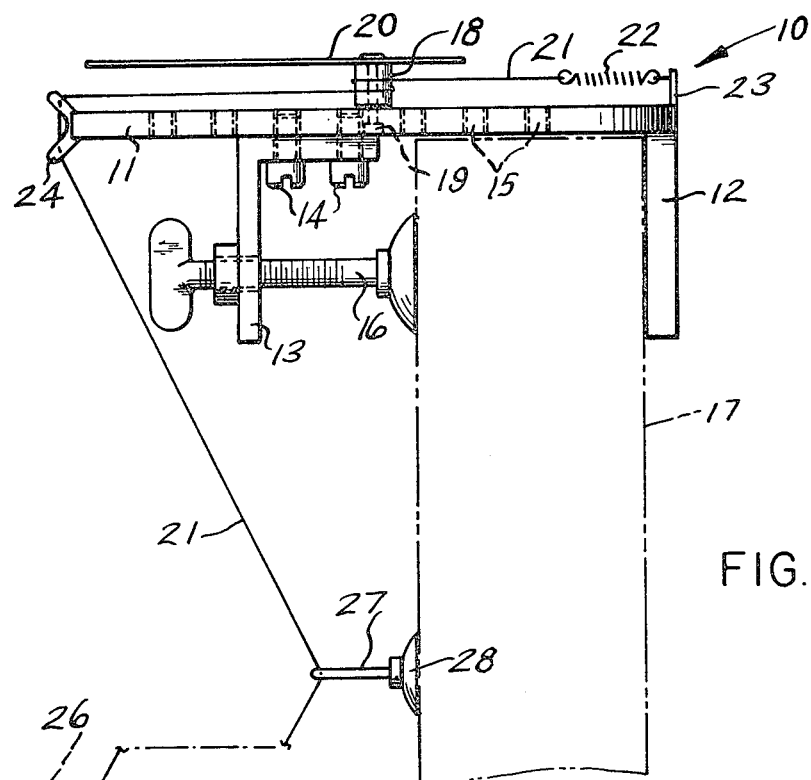
Figure 2:
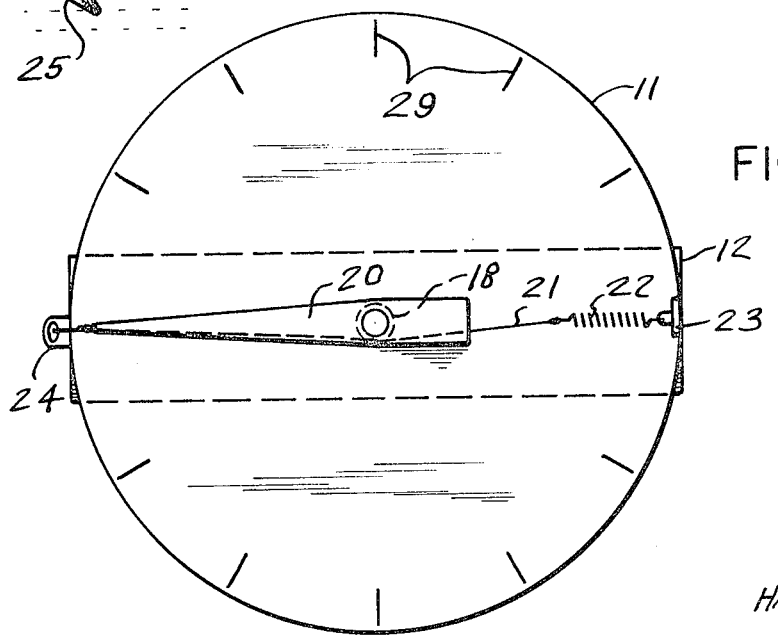

These and other objects will be readily evident upon a study of the following specification and the accompanying drawing wherein:

FIG. 1 is a side view of the present invention shown secured to a portion of a boat, the portion of the boat being shown in phantom lines; and FIG. 2 is a top plan view of FIG. 1.

According to this invention, a speed indicator 10 is shown to include a disc 11 having secured to it fixedly, a projection 12 which acts in conjunction with an L-shaped member 13 and in a manner which hereinafter will be described.

L-shaped member 13 is secured to the under side of disc 11 by means of a pair of screw fasteners 14 which may be carried in any of the plurality of threaded openings 15 through disc 11.

The L-shaped member 13 carries a screw clamp 16 which clampingly engages a portion of boat 17 in conjunction with the projection 12 of device 10.

A knurled spool 18 is rotatably carried on the top surface of disc 11 and has secured fixedly to it a pointer 20. Spool 18 is carried upon pin 19 through the center of disc 11.

A line 21 is carried on the outer periphery of spool 18 in frictional engagement therewith and a tension spring 22 is secured to one end of line 21 and secured at the other end to the projection 23 on top disc 11.

The opposite end of line 21 is freely carried within guide member 24 secured to the outer periphery of disc 11 and a weight 25 provides drag means within the water 26 in order to activate pointer 20.

When device 10 is used on the transom portion of boat 17 a guide eye 27 will freely carry line 21 and guide eye 27 is provided with suction cup 28 means for engagement with the boat 17 and guide eye 27 prevents line 21 from possibly fouling in the motor of boat 17.

Disc 11 is provided with a plurality of graduations 29 which will be numbered with speed indicating numerical characters.

As the boat 17 travels in the water, the drag upon the weight 25 of line 21 will cause the line 21 to rotate spool 18 and its associate pointer 20 and will thus give a visual speed indication upon the disc 11 by pointing to one of the plurality of graduations 29.

It shall be noted that the size of device 10 is such that it may be carried in a tackle box and accuracy of device 10 may be obtained by the spring tension against the pull or drag of weight 25 upon the line 21.

What is claim is:

1. A speed indicating device for boats, comprising a circular and calibrated disc, a rotatable pointer and spool carried by said device for indicating the speed of the hull of said boat, line means carried by the spool portion of said device enabling the drag of water to cause said pointer to rotate to indicate speed, tension spring means carried by said device allowing tension to be placed upon said line carrying a weight, said weight being dragged within the water rearward of the travel of said boat, guide means carried by said disc for said line and clamp screw means with L-shaped bracket means for securing said device to said boat, said disc being calibrated with a plurality of graduations near its outer periphery on the top surface, and said spool and pointer when rotated by the drag of said water causing the speed of said boat to be known and said pointer being secured to a knurled spool, said knurled spool carrying said line on its outer periphery in a frictional engagement, said spool being freely carried upon pin means through the center of said disc, a projection being secured to one face of said disc near its outer periphery and said projection being in conjunction with said L-shaped member secured to said disc allowing said device to be secured to a boat by means of a screw clamp carried within said L-shaped member, said L-shaped member being secured by suitable fasteners to the underside of said discs and being adaptable to be buried in placement by being placed in any of the plurality of internally threaded openings through said discs so to engage said device to both areas of various thicknesses.

2. The combination according to claim 1, wherein said lines are carried through guide means on the periphery of said disc and one end of said line is secured to tension spring means secured to a projection on the face of said disc carrying said knurled spool and said lines is carried through guide eye means having suction cup means in order to keep said line from fouling within the motor and said weight upon said line at the end of said line within the water is acted upon by the water and causes drag in order to pull said line and thus rotate said pointer, said pointer indicating the speed and said line pulls against the tension of said spring carried at he other end of said line.

* * * * *